Nov. 7, 1967   K. OECHSLIN   3,351,396

SHAFT SEAL FOR A THERMAL MACHINE

Filed June 11, 1965

INVENTOR
KONRAD OECHSLIN

BY *Dodge and Sons*
ATTORNEYS

United States Patent Office 3,351,396
Patented Nov. 7, 1967

3,351,396
SHAFT SEAL FOR A THERMAL MACHINE
Konrad Oechslin, Zurich, Switzerland, assignor to Escher Wyss Aktiengesellschaft, Zurich, Switzerland, a corporation of Switzerland
Filed June 11, 1965, Ser. No. 463,299
Claims priority, application Switzerland, June 26, 1964, 8,405/64
6 Claims. (Cl. 308—36.3)

ABSTRACT OF THE DISCLOSURE

A shaft seal including a shaft-encircling intermediate housing which extends between a hot machine housing and a cool shaft bearing. The machine end of the intermediate housing is mounted concentrically of the opening in the machine housing with radial clearance but is held fast axially. A diaphragm bridges the radial gap. The other end of the intermediate housing is radially fast, but axially movable relatively to the bearing. The seal structure accommodates axial expansion and contraction and axial position change at the bearing end of the intermediate housing, while radial changes in dimension are accommodated at the machine end.

---

Figure 1:
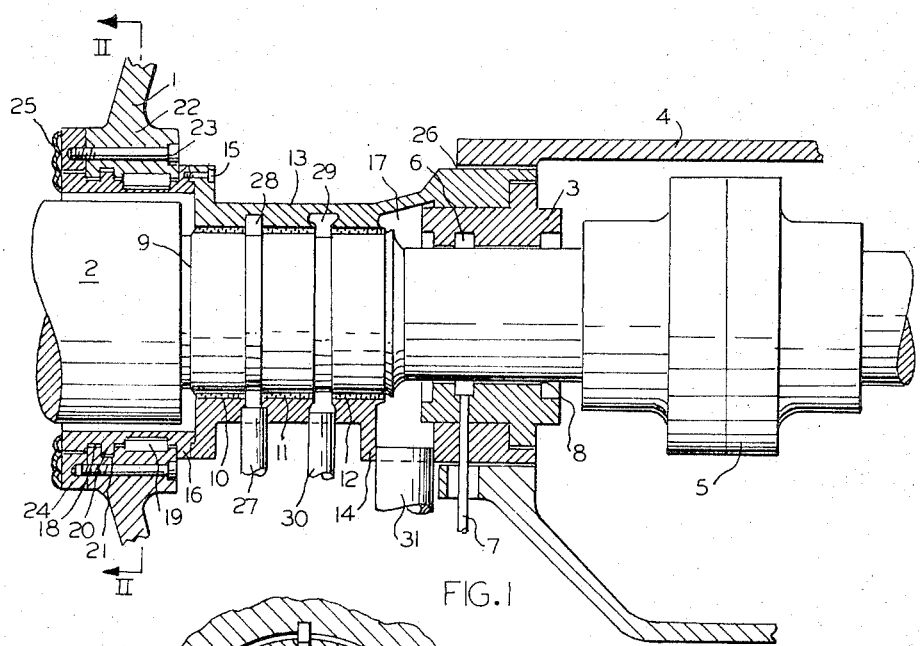

In thermal machines, such as steam or gas turbines or compressors, it is necessary, particularly in plants with closed circuit, to keep the throughways of shafts through the machine housing as fluid-tight as possible. Stuffing boxes are used for this purpose, the stuffing-box housing being formed from the machine housing and/or the bearing housing of the shaft of the machine.

In the cold machine housing, which for example only has to receive the internal pressure of the machine, while the internal temperature of the machine is received by an internal housing holding an insulating composition, the bearing housing of the shaft bearing can be screwed to the machine housing. If, however, the machine housing is hot, special devices are necessary for taking up the differences in expansion between the machine housing and the bearing housing, necessarily kept cold, in the direction of the shaft axis, as well as the relative variations in position of the machine housing in relation to the bearing housing in the axial direction of the shaft.

If a diaphragm is provided between the two housings, said diaphragm is stressed for deformation in two directions extending at right-angles to each other, and uniformly effective, low-pressure support of the diaphragm in all relative positions of the lines of contact of the diaphragm with the housings connected by it is not possible, and this constructional form therefore has the drawback that the life of the diaphragm is short.

It is the object of the invention to overcome these drawbacks. For this purpose, a shaft seal of the hereinbefore described kind is constructed according to the invention in such a manner that an intermediate housing is provided, which housing is mounted axially movable and radially fast in relation to the bearing housing at its end facing the latter housing, and at its other end facing the machine housing is mounted coaxially and centered in relation to the shaft and axially fast in relation to the machine housing, and is connected to the machine housing by a diaphragm.

Figure 2:
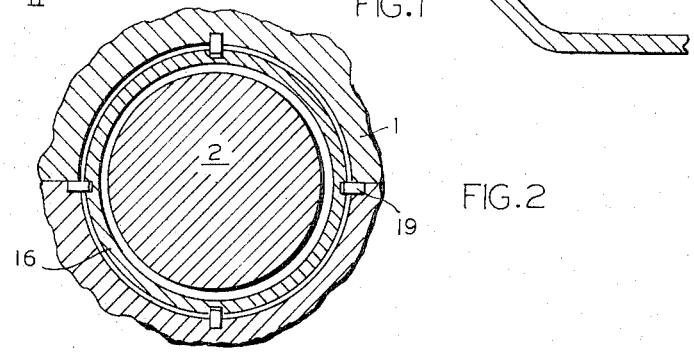
Figure 3:
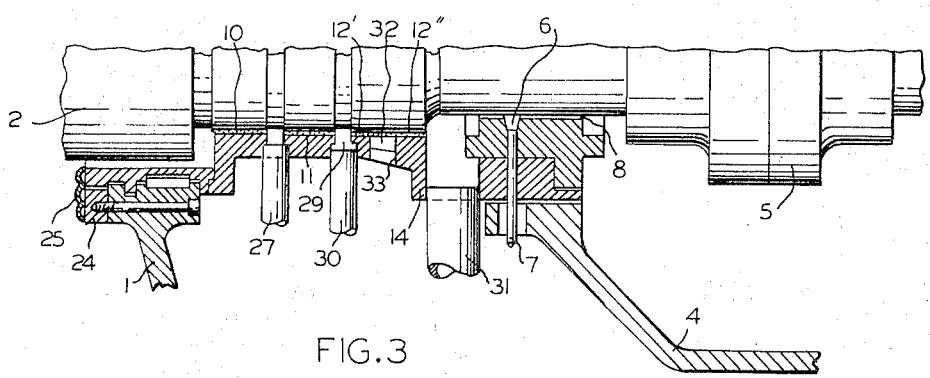

Constructional examples of the invention are shown in simplified form in the drawing, in which:

FIG. 1 shows a vertical axial section through a shaft seal of a closed-circuit gas turbine using air as working medium, FIG. 2 shows a section on the line II—II of FIG. 1, and FIG. 3 shows a vertical axial section through a shaft seal of a steam turbine.

In all the figures, corresponding parts have the same reference numerals.

The shaft seal shown in FIG. 1 acts between the hot machine housing 1, of which is shown part of the end wall on the working-medium downstream side, and the shaft 2. Remote from and externally of the machine housing 1 is the shaft bearing of shaft 2, with cold bearing housing 4 and having a bearing bush 3. At 5 is shown a shaft coupling, connecting the shaft 2 to the drive end of the shaft of a power machine, not shown. Machined in the inner side of bearing bush 3 is an annular groove 6, into which is introduced lubricating oil under pressure, via a lubricating oil supply pipe 7, whence the lubricating oil is distributed, by means of lubricating grooves not shown, over the entire bearing surface 8 of the shaft bearing. The pressurised-oil lubricated bearing 3, 4 serves as coupling-side outermost axial portion of the stuffing box of the shaft seal. The remaining axial portion of the stuffing box extends from the shaft bearing 3, 4 in the direction of the machine housing 1 up to the point on the shaft axis denoted by 9, said stuffing box portion having labyrinths 10, 11, 12, sealing in a non-contact manner.

Arranged between the machine housing 1 and the bearing housing 4 is an intermediate housing 13, comprising a sealing part 14 and an annular part 16, fastened to the said sealing part by means of screws 15. By its end facing the bearing housing 4 and formed by the corresponding end of the sealing part 14, the intermediate housing 13 is mounted axially movable and radially fast in the bearing housing 4 at the machine-housing side edge of said bearing housing. In the constructional example shown, the bearing bush 3 is rigidly connected to the intermediate housing 13, and the annular space 17 between shaft 2 and sealing part 14 of the intermediate housing 13 is fluid-tight with regard to the surroundings and to the interior of the bearing housing 4. The intermediate housing 13, at its other end facing the machine housing 1 and formed by the annular part 16, is centered in the wall of the opening 18, co-axial with the shaft, in the machine housing 1, said opening receiving the shaft 2, by means of four cotters 19, coaxially with the shaft 2 and axially fast by means of a collar 20, engaging an annular groove 21 machined in the wall of the opening 18. The hub ring 22, confining the opening 18, has, on the side situated in the machine, a ring 24 screwed fast to the machine housing 1 by means of screws 23. The annular part 16 of the intermediate housing 13 is connected by an annular corrugated diaphragm 25 to the ring 24 of the hub ring 22 of the machine housing 1. For ensuring accurate concentricity in assembling, at least three cotters, not shown, may be provided between ring 24 and the annular part 16 of the intermediate housing 13.

In the operation of the gas turbine, the diameter of the hub ring 22 and of the opening 18 will become larger owing to thermal expansion of the machine housing 1, and the axial distance between the machine housing 1 or the hub ring 22 and the cold-remaining bearing housing 4 will become less. Owing to the low heat transmission through the diaphragm 25, the annular part 16 of the intermediate housing expands radially less than the machine housing 1, and this difference in expansion will be taken up by the diaphragm 25. Since the intermediate housing 13 is fast axially to the machine housing 1, the relative variation in position between the machine housing 1 and the bearing housing 4 will be taken up by the mounting of the intermediate housing 13 in the bearing housing 4, said mounting permitting relative axial movement.

Owing to these measures, the diaphragm 25 is exposed to deformations only in the radial direction normal to the shaft axis, and as a result the service life of the diaphragm 25 will be longer, while the axial equalisation between machine housing 1 and bearing housing 4 is effected by the mounting of the intermediate housing 13 in the bearing housing 4, which mounting is subjected to scarcely any wear.

The intermediate housing 13 is connected to the bearing housing 4 in a thermally conducting manner via the supporting zone 26 so that in the supporting regions of the two housings, there is no substantial difference in temperature, thereby avoiding unwanted variations in the clearance of the bearing housing 4 with regard to the intermediate housing 13 and/or of the bearing bush 3 with regard to the shaft 2, and in addition the temperature of the bearing bush 3 is kept low, corresponding to that of the bearing housing 4. The clearance in zone 26 is necessary for allowing axial displacement of the intermediate housing 13 but is so small, that radial movement of the intermediate housing 13 is prevented.

In the constructional example shown, the bearing bush 3 is rigidly connected to the intermediate housing 13, and follows with the latter the movements of the machine housing 1 caused by thermal expansion in the direction of the shaft, which movements correspond approximately to those of that portion of shaft 2 which serves as journal. The bearing bush 3 could also be rigidly connected to the bearing housing 4, in which case there would exist along the supporting zone 26 between the bearing housing 4 and the intermediate housing 13 a gap between the space 17 and the surroundings, which gap would in any event have to be sealed by special measures. The intermediate housing 13 could also be constructed to surround the bearing housing 4 externally, or could be in some other way axially movable with regard to the bearing housing 4 and at the same time fluidtight.

In the constructional example shown, the sealing part 14 of the intermediate housing 13 is constructed as the much larger axial section, comprising the labyrinths 10, 11, 12, of the housing of the stuffing box of the shaft seal, which stuffing box, in addition to these labyrinths 10, 11, 12, also comprises the pressurised-oil lubricated and sealed shaft bearing 3, 4 of the shaft 2. It is, however, also possible to provide fewer or no labyrinths in the sealing part 14 of the intermediate housing 13, and to arrange the labyrinths partly or entirely in a special hub, in axial continuation of the hub ring 22 in and/or outside the machine housing 1, in which case the axial dimension of the intermediate housing 13 could be made correspondingly less.

The end face of the ring 24 on the hub ring 22 of the machine housing 1, which end face is directed towards the interior of the machine housing 1, extends normally to the shaft axis, as does also the end face of the annular part 16 of the intermediate housing 13, which end face is directed towards the interior of the machine, and these two end faces are flush with each other. Since the lines of contact of the diaphragm 25 with each of the parts connected by it do not vary their axial position in the region of the diaphragm in all conditions of expansion, the said two end faces form with each other an always uniformly acting, low-pressure side support for the diaphragm 25, and the lines describing the working directions of the diaphragm 25 intersect at a point situated on the axis of shaft 2 at right-angles to the axis. These measures additionally contribute to a long service life of the diaphragm 25.

At 27 is shown a sealing medium feed pipe, by means whereof packing or sealing air is introduced into an annular space 28 situated between the labyrinths 10, 11. The sealing air has a higher pressure and lower temperature than the working medium directly at the machine-interior side of the annular gap between the shaft 2 and the annular part 16 of the intermediate housing 13. Traces of sealing air therefore flow from the annular space 18 into the machine interior, the annular part 16 being cooled. This flow of sealing air, or some other sealing medium compatible with the working medium, into the machine interior is particularly advantageous when the escape of traces of working medium, for example a radioactive medium, from the machine interior is to be prevented.

The sealing medium could, however, have a lower pressure than the working medium, in which case traces of working medium would flow into the annular space 28. From the annular space 28 an escape path for the working medium leads into the annular space 29, situated between the labyrinths 11, 12 and connected to a sealing medium discharge pipe 30. In the annular space 17 which is situated between the labyrinth 12 and the bearing 3, 4 which receives lubricating and sealing oil coming from the annular groove 6 into the bearing bush 3, and which is connected to a lubricating oil discharge pipe 31, there prevails a lower pressure than in the annular space 29, so that a trace of sealing air flows from the annular space 29 to the space 17. This measure is particularly necessary when the sealing air circuit is connected to the working medium circuit, for example, therefore, when the sealing air feed pipe 27 opens with the outlet connection and the sealing medium discharge pipe 30 opens with the inlet connection of the compressor or compressors through which working medium flows, in which case it is necessary to prevent entry of oil mist into the working medium circuit. The sealing air flowing in considerable quantity from the annular space 28 to the annular space 29 cools the intermediate housing 13 persistently; the smaller quantity of sealing air flowing from the annular space 29 into the space 17 additionally cools the portion of the intermediate housing 13 which is already considerably cooled by the bearing housing 4 in consequence of thermal conduction through the supporting zone 26.

In the shaft seal shown in FIG. 3 on a steam turbine, the portion of the stuffing box situated between the annular space 29 and the space 17 is subdivided into two labyrinths 12', 12'', separated by an annular space 32, and the annular space 32 is connected to the surroundings by a duct 33. There is supplied to the annular space 28 via the sealing medium feed pipe 27 sealing steam, which has a higher pressure and lower temperature than the working steam immediately at the machine-interior side of the annular gap between the shaft 2 and the annular part 16 of the intermediate housing 13, and traces of sealing steam, cooling the annular part 16, pass into the machine interior. The other discharge path of the sealing steam leads to the annular space 29 and thence via the sealing medium discharge pipe 30 to a corresponding steam stage or to the exterior of the plant. Traces of sealing steam passing from the annular space 29 in a direction towards the shaft bearing 3, 4 through the labyrinth 12' pass from the annular space 32 out of the plant via the duct 33, as do also traces of lubricating oil passing from the space 17 through the labyrinth 12''. In this way, entry of water into the lubricating oil circuit and heating of the shaft bearing 3, 4 by sealing steam are reliably prevented.

What is claimed is:

1. Between a hot end portion of the housing of a thermal turbomachine having a circular opening for the machine shaft travering said housing end portion, and a shaft bearing having a relatively cold bearing housing arranged outside of and remote from said machine housing; a sealing device comprising a substantially tubular intermediate housing arranged to encircle said shaft and having its one end mounted in said bearing housing so as to be radially fixed and axially shiftable therein and its other end mounted in said hot end portion of the machine housing so as to be axially fixed and centered with regard to the machine axis, an annular gap being left between the two so as to allow for different thermal expansion of the end portion of the machine housing and the end of the intermediate housing mounted therein; and an annular corrugated diaphragm fixed in fluid tight manner to said end portion of the machine housing and to said end of the intermediate housing mounted therein, so as to bridge said annular gap.

2. The combination defined in claim 1 in which said end portion of the machine housing and the end portion of the intermediate housing mounted therein have supporting surfaces for the annular diaphragm, which extend at right angles to the machine axis and are substantially flush with one another.

3. The combination defined in claim 1 in which the shaft bearing has a bearing bush fixed to that end of the intermediate housing which is mounted in the bearing housing.

4. The combination defined in claim 1 in which the shaft bearing is adapted to serve as a liquid seal comprising a pressure lubricant supply channel which opens into the bearing bush at a point intermediate its ends; and a lubricant discharge connection issuing from the intermediate housing at a point situated axially adjacent that end of the bearing bush which faces the machine housing.

5. The combination defined in claim 1 in which the intermediate housing contains labyrinth shaft seals.

6. The combination defined in claim 5 in which means are provided for supplying a gaseous sealing medium under pressure to said labyrinth shaft seals.

References Cited
UNITED STATES PATENTS

| | | | |
|---|---|---|---|
| 1,562,019 | 11/1925 | Wilkinson | 308—36.1 |
| 2,199,250 | 4/1940 | Stroebel | 277—54 |

FOREIGN PATENTS

| | | |
|---|---|---|
| Ad. 33,909 | 10/1927 | France. |
| 668,034 | 7/1929 | France. |
| 1,297,169 | 5/1962 | France. |

EDGAR W. GEOGHEGAN, *Primary Examiner.*

PAUL E. MASLOUSKY, *Examiner.*